(12) United States Patent
McCarthy

(10) Patent No.: US 6,877,575 B2
(45) Date of Patent: Apr. 12, 2005

(54) METHOD AND APPARATUS FOR CONTROLLING THE SPEED OF AN ENGINE WITHIN A HYBRID ELECTRIC VEHICLE

(75) Inventor: James Paul McCarthy, Milford, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 24 days.

(21) Appl. No.: 09/539,394

(22) Filed: Mar. 31, 2000

(65) Prior Publication Data

US 2003/0047361 A1 Mar. 13, 2003

(51) Int. Cl.$^7$ ................................................. B60K 6/02
(52) U.S. Cl. ..................... 180/65.2; 180/65.3; 180/65.4
(58) Field of Search .............................. 180/65.1, 65.2, 180/65.3, 65.4, 65.6

(56) References Cited

U.S. PATENT DOCUMENTS

| | | | |
|---|---|---|---|
| 3,646,835 A | * 3/1972 | Ito et al. | 477/131 |
| 4,305,254 A | * 12/1981 | Kawakatsu et al. | 60/716 |
| 4,335,429 A | * 6/1982 | Kawakatsu | 701/102 |
| 4,621,541 A | 11/1986 | Takahashi | |
| 5,258,651 A | 11/1993 | Sherman | |
| 5,433,282 A | 7/1995 | Moroto et al. | |
| 5,697,466 A | * 12/1997 | Moroto et al. | 180/65.2 |
| 5,713,814 A | * 2/1998 | Hara et al. | 477/5 |
| 5,789,881 A | * 8/1998 | Egami et al. | 318/139 |
| 5,791,427 A | 8/1998 | Yamaguchi | |
| 5,823,281 A | 10/1998 | Yamaguchi et al. | |
| 5,846,155 A | * 12/1998 | Taniguchi et al. | 477/2 |
| 5,856,709 A | * 1/1999 | Ibaraki et al. | 290/45 |
| 5,865,263 A | * 2/1999 | Yamaguchi et al. | 180/65.2 |
| 5,875,691 A | * 3/1999 | Hata et al. | 74/661 |
| 5,903,061 A | * 5/1999 | Tsuzuki et al. | 290/40 C |
| 6,020,697 A | * 2/2000 | Shimasaki et al. | 318/140 |
| 6,054,776 A | * 4/2000 | Sumi | 290/17 |
| 6,109,237 A | * 8/2000 | Pels et al. | 123/339.19 |
| 6,175,785 B1 | * 1/2001 | Fujisawa et al. | 701/22 |
| 6,176,807 B1 | * 1/2001 | Oba et al. | 477/5 |
| 6,360,864 B1 | * 3/2002 | Thomas et al. | 192/107 R |
| 6,425,365 B1 | * 7/2002 | Peters et al. | 123/198 DB |

FOREIGN PATENT DOCUMENTS

DE    198 41 828 A1    3/2000

OTHER PUBLICATIONS

European Search Report, Dated May 22, 2001, 2 Pages.

* cited by examiner

Primary Examiner—Christopher P. Ellis
Assistant Examiner—Bridget Avery
(74) Attorney, Agent, or Firm—Brooks Kushman, PC; Carlos Hanze

(57) ABSTRACT

A hybrid electric vehicle drive system or transaxle 10 including an internal combustion engine 12, a generator/motor 14 which is coupled to engine 12 by use of a planetary gear set 20, and an electric motor 16. Drive system 10 includes a brake or clutch assembly 34 which is operatively and selectively coupled to a generator/motor 14 and is effective to supplement the generator-produced reaction torque, thereby cooperating with the generator/motor 14 to control the speed of engine 12.

19 Claims, 3 Drawing Sheets

METHOD AND APPARATUS FOR CONTROLLING THE SPEED OF AN ENGINE WITHIN A HYBRID ELECTRIC VEHICLE

FIELD OF THE INVENTION

This invention relates to a method and an apparatus for controlling the speed of an engine, and more particularly, to a method and an apparatus which controls the speed of an engine within a hybrid electric vehicle and which allows the size or capacity of the vehicle's motor/generator to be reduced.

BACKGROUND OF THE INVENTION

Hybrid electric vehicles ("HEVs") utilize both an internal combustion engine and one or more electric machines (e.g., motors/generators) to generate power and torque. The electric motor/generator(s) within a hybrid electric vehicle provides the vehicle with additional degrees of freedom in delivering the driver-demanded torque and may also be used to control the output speed of the engine.

In one type of hybrid electric vehicle, commonly referred to as a "power split" type hybrid electric vehicle, the electric generator and the internal combustion engine are interconnected by use of a planetary gear set, and the electric generator selectively provides a reaction torque which may be used to control (e.g., to reduce and/or augment) the speed of the vehicle's engine. In this manner, the generator is used to control the speed of the engine and cooperates with the planetary gear set and a traction motor to provide a continuous variable transmission ("CVT") effect. One drawback associated with this type of hybrid electric vehicle, arises from the limited amount of reaction torque which can be provided by the motor/generator.

Particularly, because the amount of torque produced by a typical internal combustion engine is relatively high, the reaction torque required to control the speed and/or output of the engine also must be relatively high. This presents a problem under certain vehicle operating conditions (e.g., high speed operating conditions), as the motor/generator is not always able to deliver the reaction torque desired or needed to control or slow the speed of the vehicle's engine. For example and without limitation, the graph 200 of FIG. 3 illustrates the performance of a typical hybrid electric vehicle generator over a range of speeds. In order to provide the relatively high reaction torque needed to control the speed/output of the engine, the size and capacity of the motor/generator used within the vehicle is typically increased, thereby undesirably adding to the vehicle's weight, expense, and the packaging space required to house the motor/generator. Alternatively, the capacity or output of the vehicle's engine may be decreased to allow the motor/generator to control the engine. However, decreasing the size of the engine undesirably results in a decrease of the overall power output of the hybrid electric vehicle.

There is therefore a need for a method and an apparatus for controlling the speed of an engine within a hybrid electric vehicle, which allows the size of the vehicle's motor/generator to be desirably reduced, or conversely, which allows the size of the vehicle's engine to be increased.

SUMMARY OF THE INVENTION

It is a first object of the invention to provide a method and an apparatus for controlling the speed of an engine within a hybrid electric vehicle which overcomes at least some of the previously delineated drawbacks of prior methods and apparatuses.

It is a second object of the invention to provide a method and an apparatus for controlling the speed of an engine within a hybrid electric vehicle which allows the size of the vehicle's motor/generator to be desirably reduced.

It is a third object of the invention to provide a method and an apparatus which utilizes a clutch or brake assembly to control the speed of an engine within a hybrid electric vehicle.

According to a first aspect of the present invention, a hybrid electric vehicle is provided. The vehicle includes an engine having an output shaft which rotates at a first speed; a generator which is coupled to the engine by use of a planetary gear set and which selectively produces a reaction torque, effective to control the first speed; and a clutch assembly which is selectively coupled to the generator and which is effective to selectively augment the reaction torque, thereby cooperating with the generator to control the first speed.

According to a second aspect of the present invention, a method is provided for controlling the speed of an engine within a hybrid electric vehicle which includes a generator having a rotor assembly which is operatively coupled to the engine. The method includes the steps of: selectively activating the generator effective to produce a negative torque which lowers the speed of the engine; and selectively and frictionally engaging the rotor assembly effective to further lower the speed of the engine.

These and other features, aspects, and advantages of the invention will become apparent by reading the following specification and by reference to the following drawings.

DETAILED DESCRIPTION OF THE PREFERRED EMBODIMENT OF THE INVENTION

Figure 1:
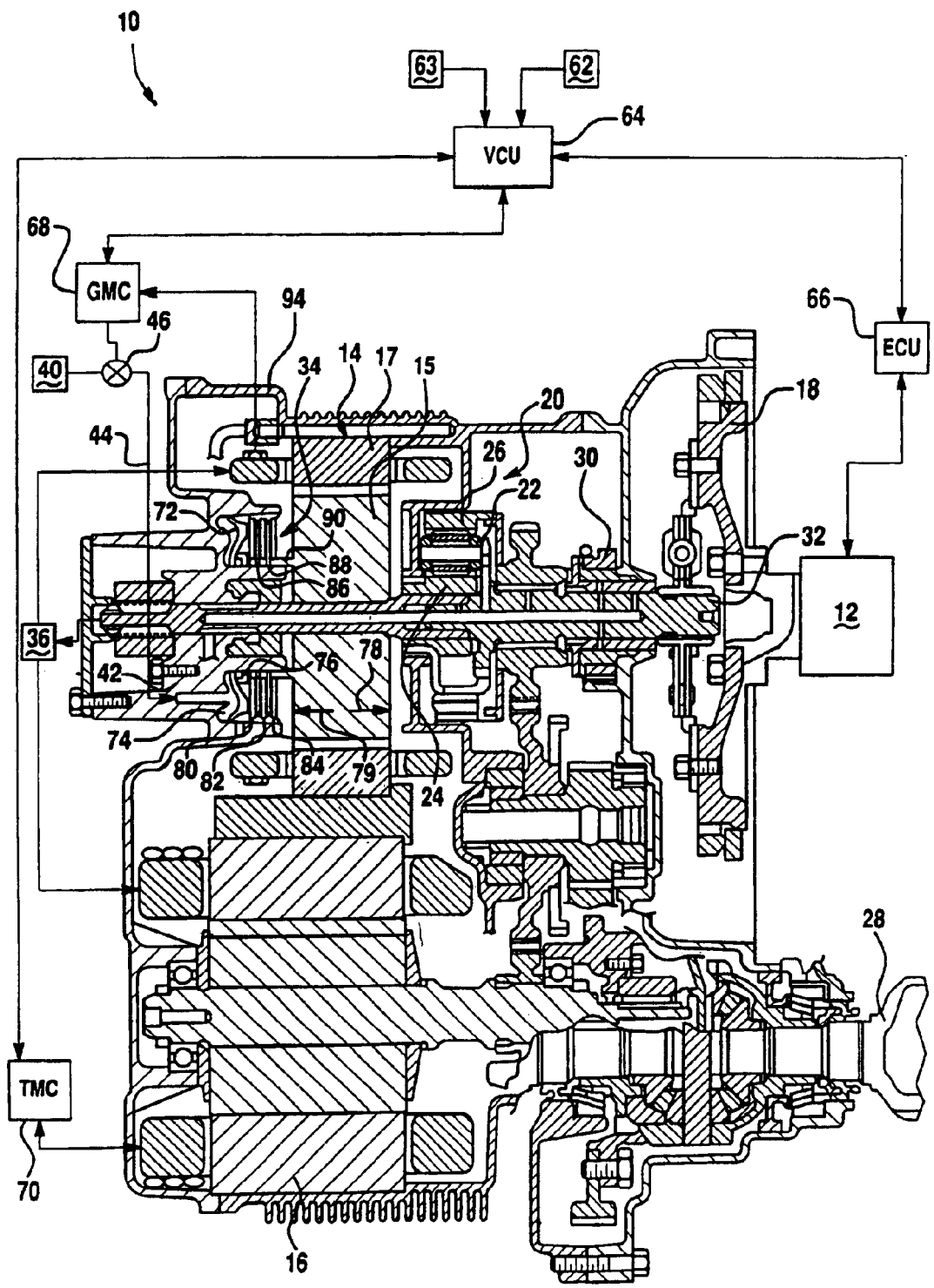
FIG. 1 is a sectional view of a "power split" hybrid electric vehicle drive system which is made in accordance with the teachings of a preferred embodiment of the present invention.

Referring now to FIG. 1, there is shown a hybrid electric vehicle transaxle or drive system 10 which is made in accordance with the teachings of the preferred embodiment of the present invention. As should be appreciated to those of ordinary skill in the art, drive system 10 is a "split-type" propulsion system, which combines the functions of both series and parallel hybrid systems, and which includes an internal combustion engine 12, an electric generator/motor 14, and an electric traction motor 16.

The engine 12 and generator 14 are interconnected by use of a conventional planetary gear set 20, including a carrier 22, a sun gear 24 and a ring gear 26. System 10 further includes a conventional flywheel and damper assembly 18, conventional one-way clutch 30 which selectively and operatively engages the output shaft 32 of engine 12, and a brake or clutch assembly 34 which selectively and operatively engages the rotor 15 of generator 14.

A conventional electrical energy storage device 36 (e.g., one or more batteries or other charge storage devices) is operatively coupled to generator 14 and to motor 16. Battery 36 receives and provides power from/to generator 14 and motor 16.

In the preferred embodiment of the invention, the engine 12 is a conventional internal combustion engine, which driveably rotates shaft 32 which is operatively coupled to the carrier 22 of the planetary gear set 20. Generator 14 is a conventional motor/generator including a stator assembly 17 and a rotor assembly 15, which is physically and operatively coupled to the sun gear 24 of the planetary gear set 20. Planetary gear set 20 allows engine 12 and generator 14 to cooperate as a "single power source" which provides a single power or torque output from the ring gear 26 of the planetary gear set 20 to the drive line 28. It should be appreciated that planetary gear set 20 further serves as a power split device that splits the output from engine 12 to the generator 14 and to the drive line 28. Generator 14 selectively provides a negative reaction torque to the engine-produced torque, thereby controlling the engine speed. Generator 14 further converts drive train energy into electrical energy (e.g., during regenerative braking) which is stored within battery 36 and which can be used to electrically power motor 16 and various other electrical components of the vehicle.

The electric motor 16 is a conventional electric motor which acts as a "second power source" that provides torque and power to the vehicle's drive line 28 independently from the first power source (i.e., engine 12 and generator 14). In this manner, the two power sources (i.e., the internal combustion engine and generator and the electric motor) cooperatively deliver torque and power to the vehicle simultaneously and independently.

In the preferred embodiment of the invention, brake or clutch assembly 34 is a conventional hydraulically operated clutch assembly. In other alternate embodiments, clutch assembly 34 may comprise any other type of selectively engageable braking or clutch assembly. A conventional source of pressurized hydraulic fluid 40 is communicatively coupled to a drum or housing portion 42 of transaxle 10 or clutch assembly 34, by use of a conventional path, tube or conduit 44. A variable solenoid valve 46, which is operatively disposed along conduit 44, and selectively controls the flow of pressurized hydraulic fluid into clutch or brake assembly 34. Particularly, variable solenoid valve 46 is communicatively coupled to and is selectively controlled by controller 68. In other alternate embodiments, valve 46 is controlled by other controllers such as the vehicle system controller 64 or the engine controller 66.

Clutch assembly 34 includes a generally ring shaped piston or member 72 which is retained within an annular groove or chamber 74 which is integrally formed within drum portion 42. Piston 72 is further operatively coupled to a conventional return spring or member 76. Piston member 72 is selectively movable within groove 74 (e.g., in the directions illustrated by arrows 78, 79). Clutch assembly 34 further includes three generally ring-shaped "friction" plates 80, 82 and 84, which are fixedly mounted to drum portion 42, and two generally ring-shaped "divider" plates 86, 88 which are fixedly coupled to rotor 15, and more particularly to hub portion 90 of rotor 15. Drum portion 42 is operatively coupled to or is integrally formed with the transaxle housing 94 and is thus rotationally stationary (i.e., portion 42 does not rotate). Hub portion 90 is operatively coupled to the rotor 15 of generator 14 and spins at a rate or speed provided by the rotor 15. Plates 80 and 84 each respectively includes an "inner" frictional surface (e.g., a frictional coating) which respectively engages plates 86 and 88, and plate 82 includes two frictional surfaces which engage plates 86 and 88. When pressurized fluid is introduced into groove 74, piston 72 is effective to move in the direction illustrated by arrow 78 and to engage plate 80, thereby compressing plates 80–88 and causing the rotation of rotor 15 to be "slowed" or stopped. Portion 42 includes a check valve (not shown) which allows fluid to be expelled from groove or chamber 74 when valve 46 is closed. In the preferred embodiment, cooling fluid is passed through plates 80–88 in a conventional manner, thereby preventing heat damage to the plates.

In the preferred embodiment of the invention, a central control system or vehicle control unit ("VCU") 64 is electrically and communicatively coupled to conventional user or driver operated controls or components 62 and to one or more conventional vehicle operating condition sensors 63. Controller 64 receives signals and/or commands generated by driver inputs 62 and vehicle operating condition sensors 63 (e.g., gear selection, accelerator position, and braking effort commands), and processes and utilizes the received signals to determine the amount of torque which is to be provided to the vehicle's drive train 28, to estimate the state-of-charge of batteries 36. Controller 64 then generates commands to the appropriate subsystems or controllers 66, 68 and 70 which selectively provide the desired torque to the drive train 28. Particularly, controller 64 determines the total amount of torque which is to be provided or delivered to drive train 28 and partitions or divides the torque among the various subsystems.

In the preferred embodiment, each controller 64–70 includes one or more microprocessors and/or integrated circuits which cooperatively control the operation of propulsion system 12. In the preferred embodiment, controller 64 comprises a conventional engine control unit or "ECU", controller 66 comprises a conventional generator/motor controller or "GMC", and controller 70 comprises a traction motor controller or "TMC". Controllers 64–70 may each comprise a separate controller or may be embodied within a single controller, chip, microprocessor or device.

In operation, controller 64 receives commands, data, and/or signals from driver operated controls 62 and from vehicle sensors 63. Based upon this received data, controller 64 calculates or determines the overall amount of torque which is being demanded or requested by the driver/user of the vehicle. Upon determining the desired or demanded torque, controller 64 communicates control signals to controllers 66, 68 and 70, effective to cause engine 12, generator 14 and motor 16 to cooperatively provide the demanded torque to drive train 28. Controller 64 further monitors the speed of engine 12 and selectively and controllably activates generator 14 and clutch assembly 34 to hold or maintain the speed of engine 12 at a desired level, range or value. This may be done in addition to, or in lieu of, the torque produced by the generator motor production of electricity.

Figure 2:
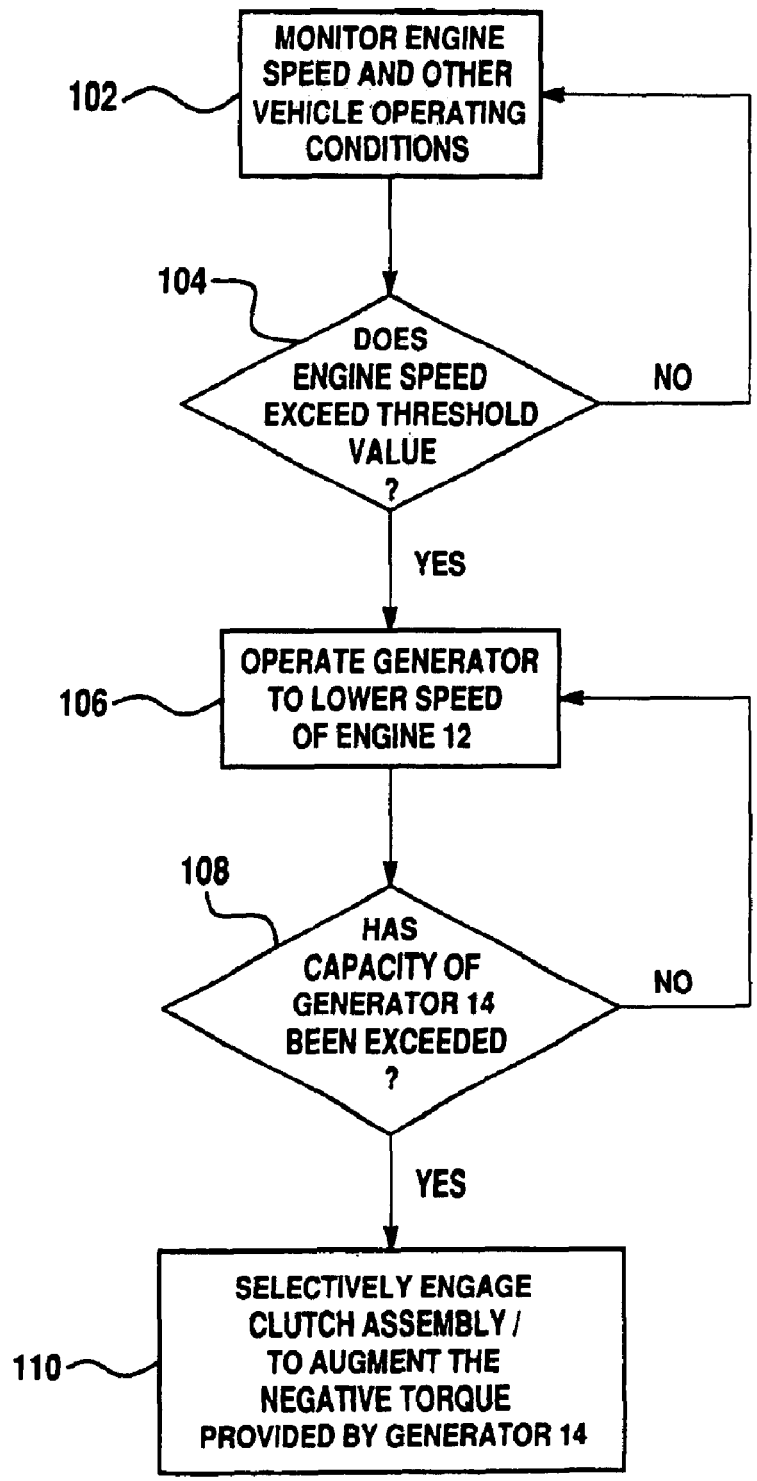
FIG. 2 illustrates one non-limiting example of a clutch control strategy utilized by the drive system shown in FIG. 1.
Figure 3:
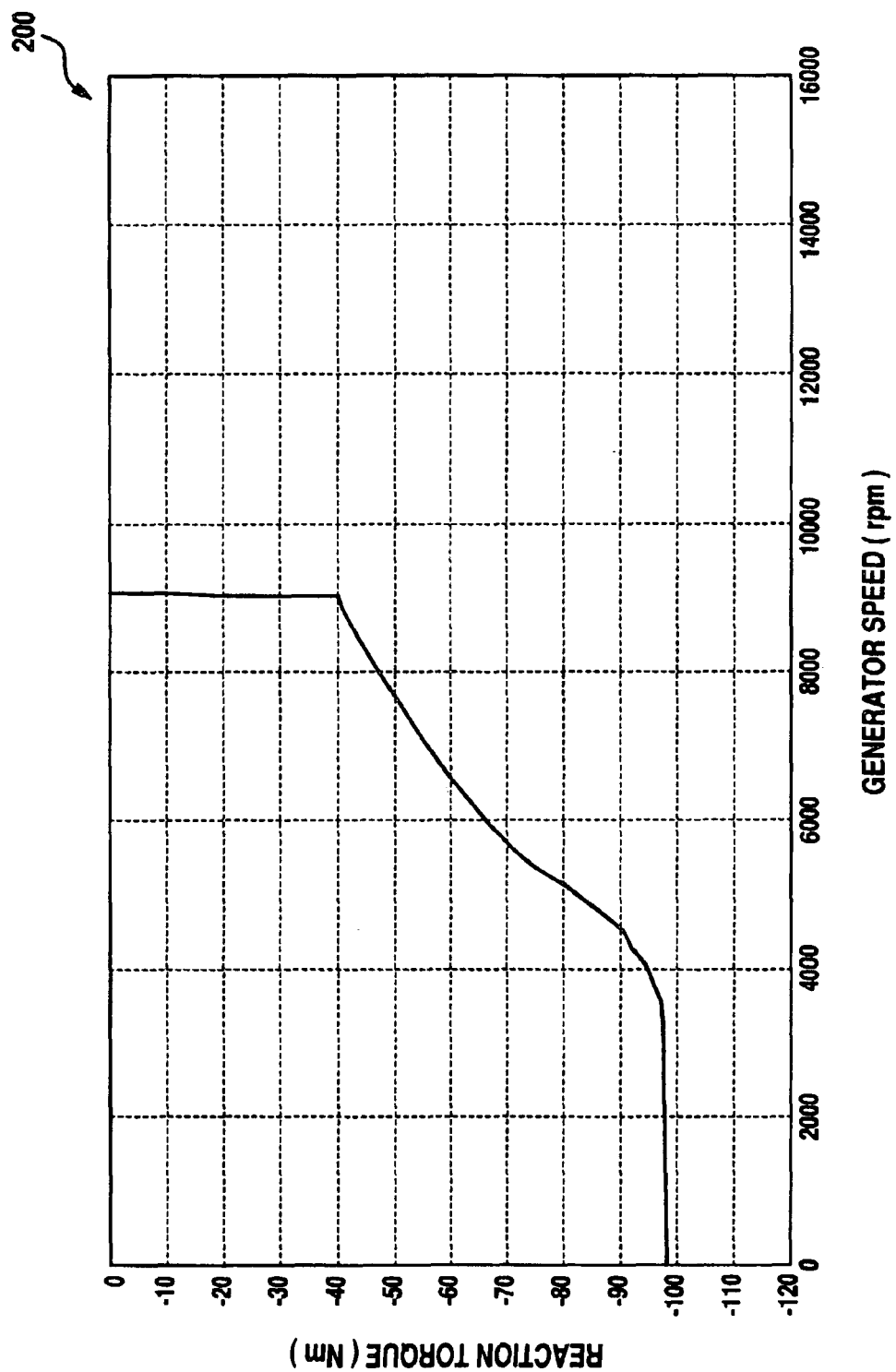
FIG. 3 is a graph illustrating the performance of a typical generator over a range of speeds.

Referring now to FIG. 2, there is shown an engine speed control strategy 100 which is utilized by controller 64. As shown in functional block or step 102, controller 64 monitors the speed of the engine 12 and other vehicle operating conditions by the use of sensors 63. In the preferred embodiment of the invention, controller 64 monitors the position of the vehicle's acceleration pedal and estimates the state-of-charge of batteries 36. In functional block or step 104, controller 64 compares the measured vehicle speed to a predetermined threshold value which is stored within controller 64. Also in the preferred embodiment of the invention, the threshold speed value is a dynamic threshold value which depends upon or is a function of the position of the accelerator pedal and the estimated state-of-charge of batteries 36. Particularly, in the preferred embodiment of the invention, the threshold speed value is lower when the batteries 36 are at or near their charging capacities, and when the accelerator pedal is not depressed. In other non-limiting embodiments, controller 64 may perform additional or different comparisons in step 104 to determine whether to proceed to functional block or step 106.

If the threshold in step 104 has not been exceeded, controller 64 returns to step 102 and continues to monitor the engine speed and other vehicle operating conditions. If the threshold in step 104 has been exceeded, controller 64 determines that the speed of engine 12 should be reduced in order to prevent damage to generator 14 and/or batteries 36 and proceeds to functional block or step 106.

Because closing the throttle of engine 12 reduces the efficiency of engine 12 and reduces the quality and smoothness of the vehicle's ride, controller 64 utilizes the generator 14 to lower the speed of engine 12 in functional block or step 106. Particularly, controller 64 generates a signal to generator controller 68, effective to cause controller 68 to operate the generator 14 as a motor to provide a "negative" reaction torque (i.e., a torque in the direction opposite to the direction of rotation of engine output shaft 32), thereby controlling and/or slowing the speed of engine 12. In functional block or step 108, controller 64 and/or 68 determine whether the capacity of the generator 14 has been exceeded (e.g., whether the generator 14 is sufficient on its own to slow or hold the speed of engine 12 below the threshold value). If the capacity of generator 14 has not been exceeded (e.g., the threshold value has not been exceeded), controller 64 returns to step 106 and continues to utilize only generator 14 to control the speed of engine 12. When controller 64 and/or controller 68 determines that the generator-provided reaction torque is no longer sufficient to control the speed of the engine 12 (e.g., the threshold value has been exceeded), controller 64 proceeds to functional block or step 110. In step 110, controller 64 generates a signal to controller 68 effective to selectively engage clutch or brake assembly 34, in order to slow the rotation of rotor 15 and augment the negative torque provided by generator 14.

Particularly, in step 110, controller 68 generates a signal to variable solenoid valve 46, effective to open the valve 46 to a certain extent or amount, which may be a function of (e.g., proportional to) the additional negative torque required to hold the speed of engine 12 at a certain level or value. Once valve 46 is opened, pressurized hydraulic fluid flows through conduit 44 into chamber or groove 74. The pressure of the provided fluid causes pressure to "build" or increase behind piston 72. As the pressure of the hydraulic fluid "builds" or increases within groove 74, piston 72 moves in the direction illustrated by arrow 78.

As piston 72 moves in the direction of arrow 78, spring 76 is compressed or retracted and piston 72 is forced against plate 80. The force provided by piston 72 is effective to compress and/or frictionally engage plates 80–88, thereby slowing the speed of rotor 15 and engine 12. When valve 46 is closed, return spring 76 moves piston 72 in the direction of arrow 79, effective to return piston 72 to its original position, thereby disengaging plates 80–88.

By controlling the opening of variable solenoid valve 46 in a modulated manner and for relatively brief periods of time, controller 68 is able to control the pressure within chamber 74, thereby providing the additional torque necessary to hold engine 12 at a desired speed. In this manner, clutch assembly 34 is able to provide more or less negative torque based upon the speed or desired speed of engine 12. By using clutch assembly 34 in a modulated manner, vehicle drive system 10 is able to prevent damage to generator 14 and batteries 36. Additionally, because the present invention utilizes clutch assembly 34 to augment the reaction torque of generator 14, the size of generator 14 can be desirably reduced relative to prior systems or alternatively the size of engine 12 can be desirably increased.

It is understood that the invention is not limited by the exact construction or method illustrated and described above, but that various changes and/or modifications may be made without departing from the spirit and/or the scope of the inventions.

What is claimed is:

1. A vehicle drive system comprising:
    an engine having an output shaft which rotates at a first speed;
    a generator which is operatively coupled to said engine which selectively produces a reaction torque, effective to control said first speed;
    a power transfer unit interconnecting the engine and the generator, the power transfer unit being configured to receive torque from the engine and the generator, and to deliver torque to drive the vehicle; and
    a clutch assembly having a first portion coupled to said generator such that the first portion can be rotated by said generator regardless of the direction of rotation of said generator, said clutch assembly having another portion rotationally fixed, wherein said clutch assembly is selectively engageable to provide a braking torque to said generator and which is effective to selectively augment said reaction torque of said generator, thereby selectively increasing said reaction torque applied to said output shaft by said generator to control said first speed, and wherein at least a portion of the clutch assembly is disposed on a hub portion of the generator, located to allow full torque transfer between the engine and the power transfer unit when the clutch assembly is engaged.

2. The drive system of claim 1 further comprising:
    a controller which is communicatively coupled to said generator, to said engine, and to said clutch assembly, said controller being effective to determine an amount of reaction torque required to control said first speed, and based upon said amount of reaction torque, to cause said generator and said clutch assembly to cooperatively provide said reaction torque.

3. The drive system of claim 1 wherein said generator is coupled to said engine by use of a planetary gear set.

4. The drive system of claim 2 wherein said clutch assembly is communicatively coupled to a source of pressurized fluid by use of a selectively actuatable valve assembly, and wherein said controller is effective to selectively actuate said valve assembly, thereby controlling said reaction torque.

5. The drive system of claim 4, wherein said valve assembly comprises a variable solenoid valve.

6. The drive system of claim 3, further comprising a motor which cooperates with said generator and said engine to power said drive system.

7. The drive system of claim 6 wherein said motor, said engine, and said generator are arranged in a power-split configuration.

8. An apparatus for use within a vehicle including an engine which operates at a first speed, said apparatus being effective to control said first speed and comprising:
    a generator including a stator assembly and a rotor assembly which is operatively coupled to said engine, said generator being effective to selectively provide a first torque through said rotor assembly, said torque being effective to control said first speed;

a power transfer unit interconnecting the engine and the generator, the power transfer unit being configured to receive torque from the engine and the generator, and to deliver torque to drive the vehicle; and a clutch assembly having at least one friction plate fixedly coupled to said vehicle and rotationally stationary, and at least one divider plate coupled to said rotor assembly such that the at least one divider plate can be rotated by said rotor assembly regardless of the direction of rotation of said rotor assembly, the at least one divider plate being selectively and frictionally engageable with said at least one friction plate effective to provide a second torque through said rotor assembly, said second torque being effective to augment said first torque, thereby further controlling said first speed, and wherein at least a portion of the clutch assembly is disposed on a hub portion of the generator, located to allow full torque transfer between the engine and the power transfer unit when the clutch assembly is engaged.

9. The apparatus of claim 8 wherein said clutch assembly includes a drum portion, a plurality of first plates which are coupled to said drum portion, a plurality of second plates which are coupled to said generator, and a piston which is effective to selectively compress said plurality of first and second plates, thereby providing said second torque.

10. The apparatus of claim 8 wherein said clutch assembly comprises a hydraulic clutch assembly.

11. The apparatus of claim 8 wherein said engine and said generator are operatively coupled by use of a planetary gear set.

12. The apparatus of claim 9 further comprising:

a sensor which measures said first speed and which generates a first signal based upon said measured first speed; and a controller which is communicatively coupled to said sensor, to said generator and to said clutch assembly, said controller being effective to receive said first signal and, based upon said first signal, to selectively cause said generator to provide said first torque.

13. The apparatus of claim 12 wherein said controller is further effective to compare said first signal to a threshold value and if said first signal exceeds said threshold value to selectively cause said clutch assembly to provide said second torque.

14. A method for controlling the speed of an engine within a vehicle including a generator having a rotor assembly which is operatively coupled to said engine, said method comprising the steps of:

selectively activating said generator effective to produce a negative torque which lowers said speed of said engine;

providing a power transfer unit interconnecting the engine and the generator, the power transfer unit being configured to receive torque from the engine and the generator, and to deliver torque to drive the vehicle;

providing a clutch assembly having non-rotating friction plates and divider plates which are coupled to said rotor assembly, wherein said plates of said clutch assembly may be operatively engaged to create a frictional braking force, and wherein at least a portion of the clutch assembly is disposed on a hub portion of the generator, located to allow full torque transfer between the engine and the power transfer unit when the clutch assembly is engaged; and selectively and frictionally engaging said clutch member plates to impart said created frictional braking force to said rotor assembly effective to further lower said speed of said engine.

15. The method of claim 14 further comprising the steps of:

monitoring said speed;

comparing said measured speed to a first threshold value; and selectively activating said generator if said measured speed exceeds said threshold value effective to cause said speed to remain below said threshold value.

16. The method of claim 15 wherein said generator has a capacity, said method further comprising the steps of:

determining whether said capacity has been exceeded; and selectively and frictionally engaging said rotor assembly if said capacity has been exceeded, thereby causing said speed to remain below said threshold value.

17. The method of claim 16 wherein said rotor assembly is selectively and frictionally engaged by use of a brake assembly.

18. The method of claim 16 wherein said rotor assembly is selectively and frictionally engaged by use of a clutch assembly.

19. The method of claim 16 wherein said engine and said rotor assembly are operatively interconnected by use of a planetary gear set.

* * * * *